(12) United States Patent
Chang et al.

(10) Patent No.: US 7,737,854 B2
(45) Date of Patent: Jun. 15, 2010

(54) RADIO FREQUENCY IDENTIFICATION TAG, METHOD OF FABRICATING THE SAME, AND METHOD OF USING THE SAME

(75) Inventors: Shun-Chi Chang, Shulin (TW); Min Shun Wu, Tucheng (TW); Yung Sheng Kuo, Fongshan (TW)

(73) Assignee: Yuen Foong Yu Paper Mfg. Co. Ltd., Taipei (TW)

( * ) Notice: Subject to any disclaimer, the term of this patent is extended or adjusted under 35 U.S.C. 154(b) by 236 days.

(21) Appl. No.: 12/016,327

(22) Filed: Jan. 18, 2008

(65) Prior Publication Data
US 2009/0027206 A1 Jan. 29, 2009

(30) Foreign Application Priority Data
Jul. 27, 2007 (TW) .............................. 96127662 A (51) Int. Cl.
*G08B 13/14* (2006.01)

(52) U.S. Cl. .................................................. 340/572.3
(58) Field of Classification Search ... 340/572.1–572.9; 343/700 R
See application file for complete search history.

(56) References Cited

U.S. PATENT DOCUMENTS

2007/0069895 A1* 3/2007 Koh ......................... 340/572.1
2007/0188327 A1* 8/2007 Keeton et al. ............ 340/572.7

* cited by examiner

*Primary Examiner*—Phung Nguyen
(74) *Attorney, Agent, or Firm*—Volpe and Koenig, P.C.

(57) ABSTRACT

A radio frequency identification tag is provided. The radio frequency identification tag includes a body and a cutting indication formed on the body. The body includes a substrate, an antenna disposed on the substrate and an integrated circuit disposed on the substrate and electrically connected to the antenna for performing a radio frequency communication. An extension of the cutting indication intersects with the antenna to separate the body into two parts after breaking.

19 Claims, 6 Drawing Sheets

RADIO FREQUENCY IDENTIFICATION TAG, METHOD OF FABRICATING THE SAME, AND METHOD OF USING THE SAME

FIELD OF THE INVENTION

The present invention relates to an identification tag and its fabrication method, and more particularly to a radio frequency identification tag and its fabrication method.

BACKGROUND OF THE INVENTION

In the general logistics management system, the distributed goods have the identification elements for the identification use. Most of the identification elements are bar codes or radio frequency identification (RFID) tags currently. The general application of the bar code is to attach the bar code on the goods for identification use, and the saved information of the goods can be found in the database of the logistics management, after the bar code reader reads the code. Then the information of the goods can be further updated, if required. Although the cost of using bar codes is lower than that of using RFID tags, however the bar codes can be easily smudged or fallen off, and then the bar codes lose the identification function. Moreover, the bar code reader can read only single code each time, and the distance between the bar code and the bar code reader is limited to a short distance. Therefore the time cost is increased in the logistics management.

The application of RFID tag is to use the RFID reading and writing machine to read or to write the information of goods. The RFID reading and writing machine can read the information of hundreds of goods each time within the detection range of the radio frequency. The identification function still works, even though the RFID tags are covered by the non-metal materials, e.g. paper, wood, plastic, etc. In addition, the RFID tags are not easy to be damaged and can be reused repeatedly, and the information of RFID tags can be updated repeatedly. For those people who need to arrange a lot of laboring for tracking the warehouse goods in the past, the RFID tags are able to provide the warehouse and logistics management with high efficiency for them.

However the convenience of RFID tags has caused the issue of privacy invasion at the same time, since the RFID tags can be read by other RFID readers as long as those RFID tags are within the detection range of the radio frequency. The merchandise bought by the customers can not only be tracked, but also can be monitored by the RFID readers ubiquitously existing in the streets. Therefore, this new RFID technology is repulsive to a lot of customers. In order to solve this problem, currently most sellers disable the RFID function by detaching the RFID tags or by deleting the information data of the RFID tags, when the merchandise is sold. However, this way causes the management problem on the follow-up tracking for the post sale service, for example, the merchandise return, because the information can not be resumed by the RFID tags. On the other hand, some sellers provide special bags, inside which the RFID of the merchandise can not be read by the RFID readers, but this type of special bags are not cheap.

In order to solve the mentioned problems, the inventors of the present invention develop a new RFID tag, its fabrication method and its use method, after a lot of trials and improvements. The present invention is described below.

SUMMARY OF THE INVENTION

In accordance with one aspect of the present invention, a radio frequency identification tag is provided for solving the inconvenience problem of bar codes in the warehouse and logistics management and for solving the privacy invasion problem of radio frequency identification systems.

In accordance with another aspect of the present invention, a radio frequency identification tag is provided. The radio frequency identification tag includes a body and a cutting indication formed on the body. The body includes a substrate, an antenna disposed on the substrate and an integrated circuit disposed on the substrate and electrically connected to the antenna for performing a radio frequency communication. An extension of the cutting indication intersects with the antenna to separate the body into two parts after breaking.

Preferably, the body further includes two covering pieces for packaging the substrate, the antenna and the integrated circuit between the two covering pieces. The integrated circuit includes a memory for storing information.

Preferably, the two covering pieces are made of a flexible material.

Preferably, the body further includes a piece for packaging the antenna and the integrated circuit between the substrate and the piece.

Preferably, the piece is made of a flexible material.

Preferably, the substrate is made of a flexible material, and the antenna is a loop circuit.

Preferably, the flexible material is selected from a group consisting of a fiber, a synthetic paper, a plastic, and a polymer material.

Preferably, the antenna includes two circuits mounted respectively on two opposite sides of the integrated circuit.

Preferably, the cutting indication is one of a cutting line and a cutting notch.

Preferably, the material of the antenna is selected from a group consisting of conductive ink, conductive polymer, gold, copper, iron, silver, aluminum, chrome, and alloy thereof.

Preferably, one of the two parts includes the integrated circuit and a first part of the antenna, and the other of the two parts includes only a second part of the antenna.

Preferably, the one of the two parts includes the integrated circuit, and the first part of the antenna is capable of performing the radio frequency communication.

In accordance with a further aspect of the present invention, a method for fabricating a radio frequency identification tag is provided. The method for fabricating a radio frequency identification tag includes the steps of a) providing a substrate, b) forming a body by disposing an integrated circuit and an antenna on a surface of the substrate, c) electrically connecting the integrated circuit and the antenna for performing a radio frequency communication, and d) forming a cutting indication on the body, where an extension of the cutting indication intersects with the antenna to separate the body into two parts after breaking.

Preferably, the method for fabricating a radio frequency identification tag further includes a step of providing a piece for packaging the antenna and the integrated circuit between the substrate and the piece, before forming the cutting indication.

Preferably, the method for fabricating a radio frequency identification tag further includes a step of providing two pieces for packaging the antenna and the integrated circuit between the two pieces, before forming the cutting indication.

Preferably, one of the two parts includes the integrated circuit and a first part of the antenna, the other of the two parts includes only a second part of the antenna, and the cutting indication is one of a cutting line and a cutting notch.

In accordance with a further aspect of the present invention, a use of a radio frequency identification tag is provided. The radio frequency identification tag includes a body, and a cutting indication formed on the body. The body includes a substrate, an antenna mounted on the substrate, and an integrated circuit mounted on the substrate and electrically connected to the antenna for performing a radio frequency communication. An extension of the cutting indication intersects with the antenna to separate the body into two parts after breaking. The use of a radio frequency identification tag includes steps of a) disposing the radio frequency identification tag on an article, and b) separating the radio frequency identification tag into two parts and leaving the part comprising the integrated circuit and a part of the antenna on the article.

Preferably, the use of a radio frequency identification tag further includes a step of updating information of the article by performing another radio frequency communication with the part of the radio frequency identification tag kept by the buyer.

Preferably, the separating step is performed by tearing along the cutting indication and the cutting indication is one of a cutting line and a cutting notch.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1A:
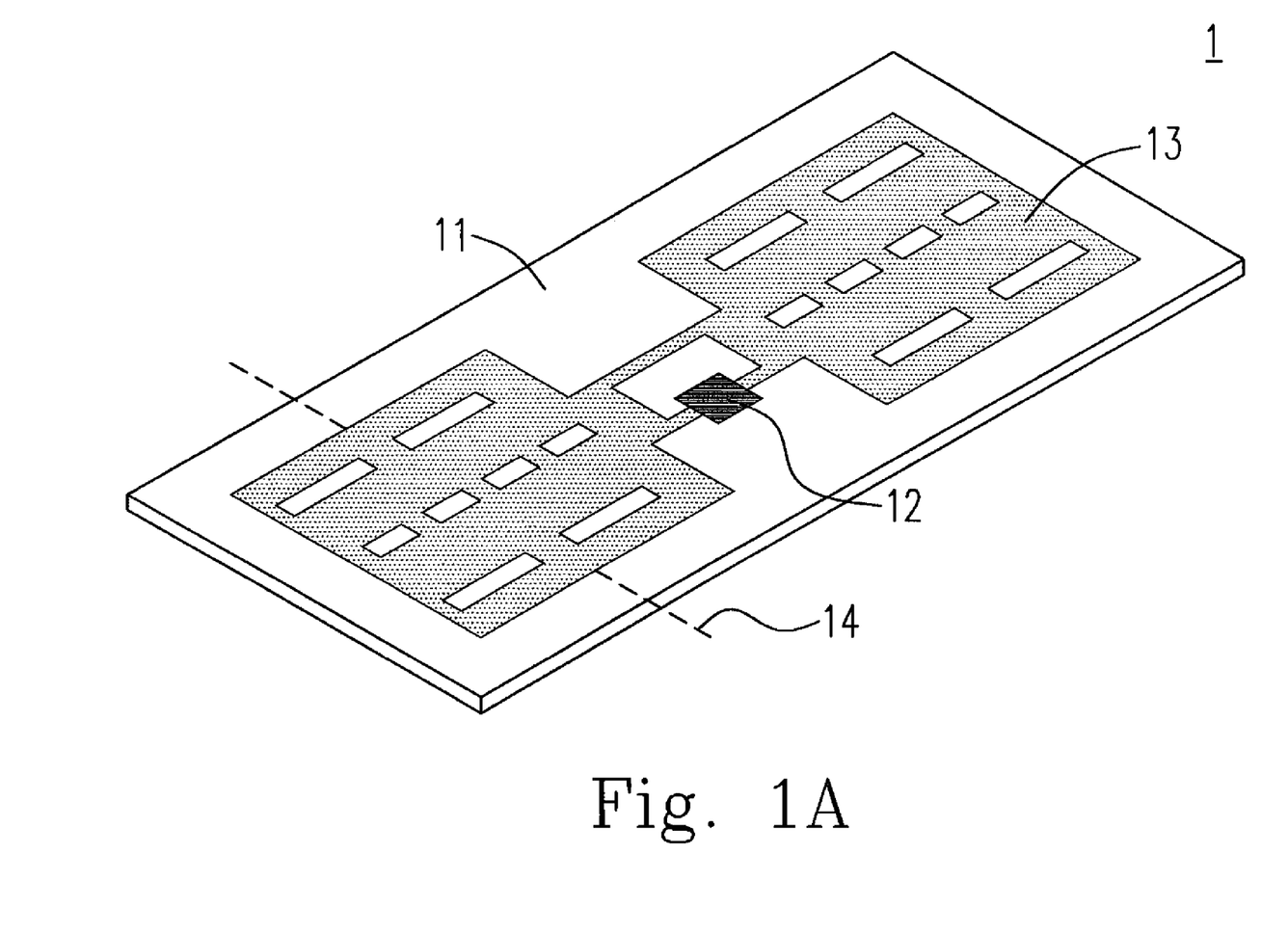
FIG. 1A is a schematic diagram showing the radio frequency identification tag according to a first preferred embodiment of the present invention.

Please refer to FIG. 1A, which is a schematic diagram showing the radio frequency identification tag according to a first preferred embodiment of the present invention. As shown in FIG. 1A, the RFID tag 1 includes a substrate 11, an integrated circuit 12 and an antenna 13, where the integrated circuit 12 and the antenna 13 are disposed on the substrate 11. The integrated circuit 12 containing a memory with the saved identification information is electrically connected to the antenna 13. In addition, the RFID tag 1 further includes two cutting lines 14, either of which is located on the extension line of the other. The extension line of the cutting line 14 will pass the antenna 13, which will be separated into two parts after breaking along the cutting lines 14.

The substrate 11 can be made in various shapes according to the requirements of the various applications. For example, when the RFID tag 1 is used in the hospital for the identification of the patent, the RFID tag 1 can be made like a hand chain put on the wrist of the patient. If the substrate 11 is made of flexible material, then a lot of applications and convenience will be added on this type of RFID tag 1. The flexible materials include fibers, synthetic paper, plastic, polymer materials, etc. The antenna 13 of this embodiment includes two circuits mounted respectively on two opposite sides of the integrated circuit. The circuits of the antenna 13 can be designed as loop circuits. In practice, the pattern of the antenna 13 can be variously designed according to the actual requirements. Basically, the bigger the size of the antenna 13 is, the longer the communication distance of the radio frequency will be. The materials of the antenna 13 can be conductive ink, conductive polymer, gold, copper, iron, silver, aluminum, chrome, or the alloys of the above metals. Copper is widely used, since its conductivity is high and can be intricately finely manufactured.

Figure 1B:
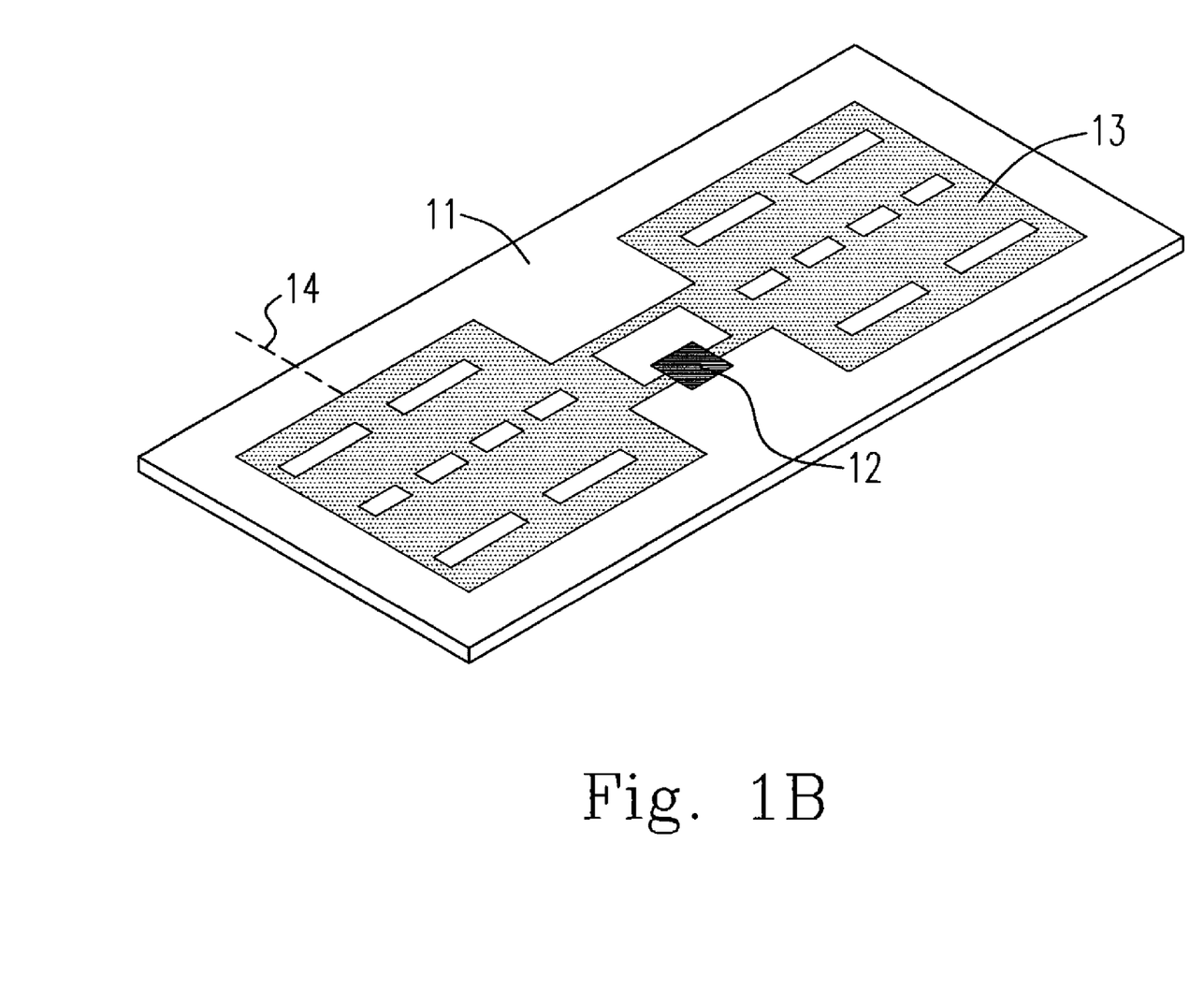
FIG. 1B is a schematic diagram showing the radio frequency identification tag according to a second preferred embodiment of the present invention.

Please refer to FIG. 1B, which is a schematic diagram showing the radio frequency identification tag according to a second preferred embodiment of the present invention. The difference between the first embodiment and this embodiment is that this embodiment contains only one cutting line 14. The same effect as the first embodiment will be achieved for this embodiment after breaking along the cutting line 14.

Figure 1C:
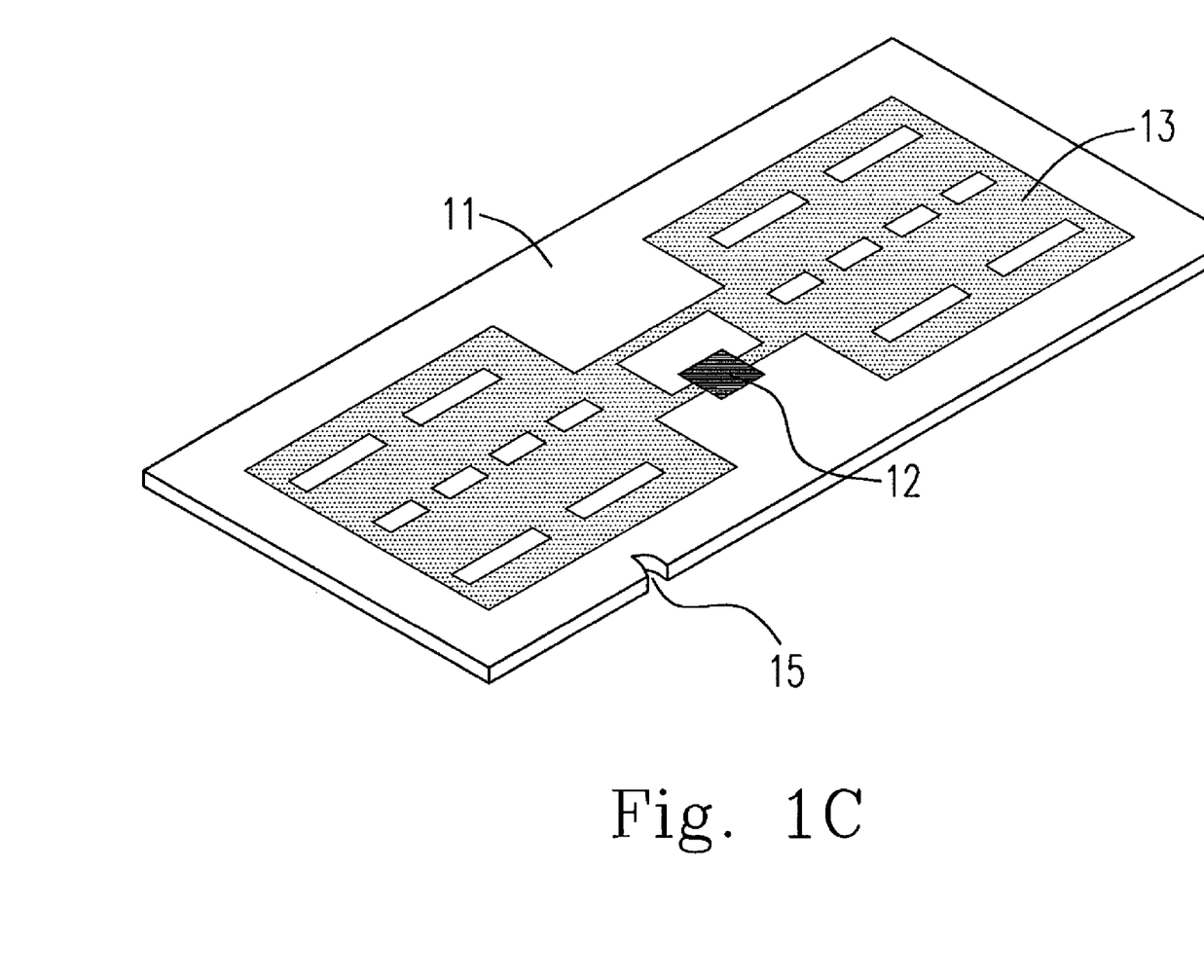
FIG. 1C is a schematic diagram showing the radio frequency identification tag according to a third preferred embodiment of the present invention.

Please refer to FIG. 1C, which is a schematic diagram showing the radio frequency identification tag according to a third preferred embodiment of the present invention. The difference between the second embodiment and this embodiment is that this embodiment contains a cutting notch 15 in lieu of the cutting line 14 in the second embodiment. The cutting notch 15 is located on the edge of the RFID tag 1, and is pointing to the antenna 13. The location of the cutting notch 15 can be set as long as the antenna 13 is separated into two parts without damaging the integrated circuit 12 after breaking along the cutting notch 15. More than one cutting notch 15 can be disposed in this embodiment according to the actual requirements.

Figure 2:
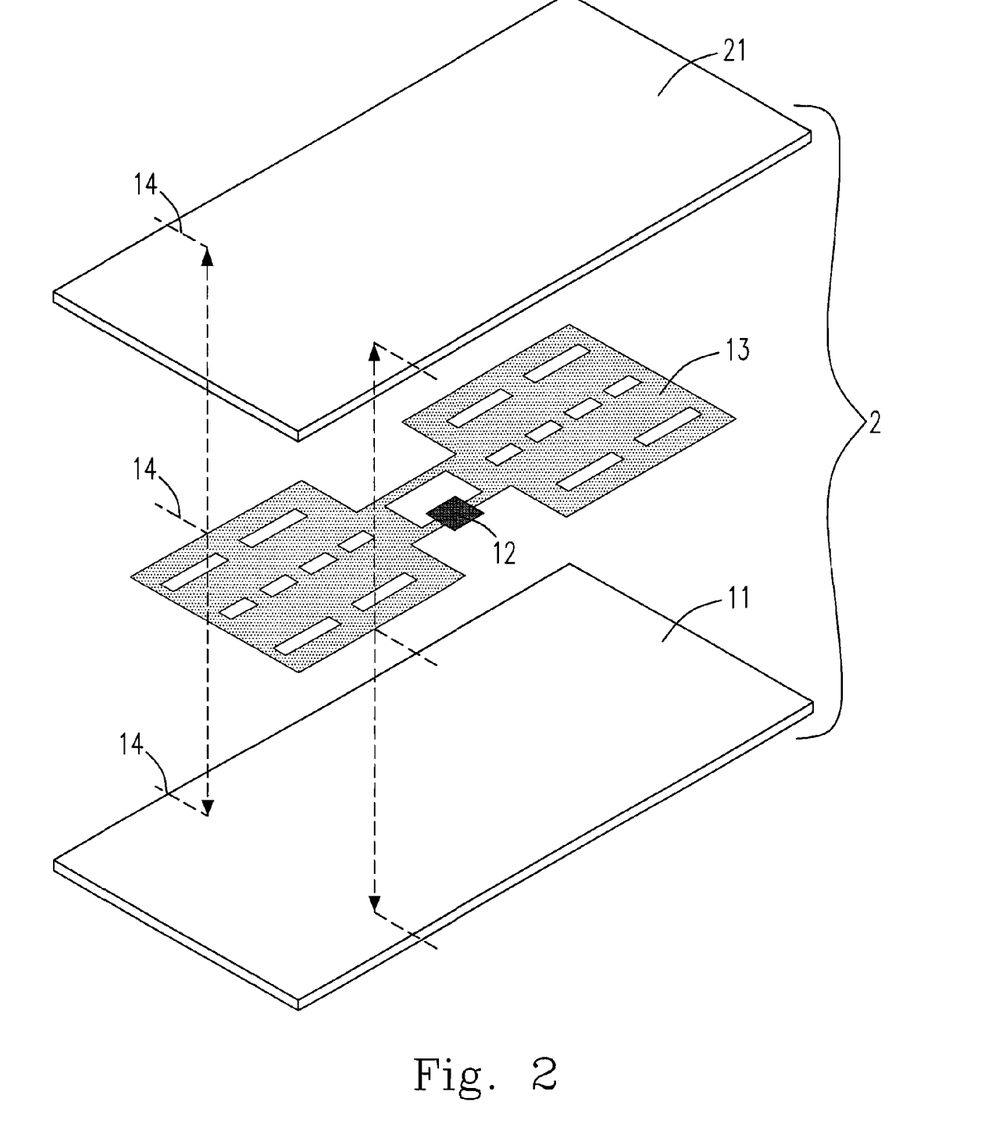
FIG. 2 is an exploded view of the radio frequency identification tag according to a fourth preferred embodiment of the present invention.

Please refer to FIG. 2, which is an exploded view of the radio frequency identification tag according to a fourth preferred embodiment of the present invention. The difference between this embodiment and the previous embodiments is that the RFID tag 2 of this embodiment further includes a piece of cover plate 21, which can protect the antenna 13 and the integrated circuit 12. The material of the cover plate 21 can be the same as or different from that of the substrate 11. However, if the flexible material is also used for the cover plate 21, then a lot of applications and convenience will be added on this type of RFID tag 2. The flexible materials include fibers, synthetic paper, plastic, polymer materials, etc. The sizes of the antenna 13 and the integrated circuit 12 can be smaller than those of the substrate 11 and the covering plate 21, so that the antenna 13 and the integrated circuit 12 can be hermetically packaged between the substrate 11 and the covering plate 21. The packaging methods include adherence by the glue, lamination, thermal forming, seal pressing, injection molding, dripping forming, etc., depending on the materials and shapes of the substrate 11 and the covering plate 21. The RFID tag 2 of this embodiment includes two cutting lines 14, either of which is located on the extension line of the other. The extension line of the cutting line 14 passes the antenna 13, so that the RFID tag 2 including the substrate 11, the antenna 13 and the covering plate 21 can all be separated into two parts after breaking along the cutting line 14. The materials and patterns of the antenna 13 are the same as those in the first embodiment, and are not mentioned again here.

Figure 3:
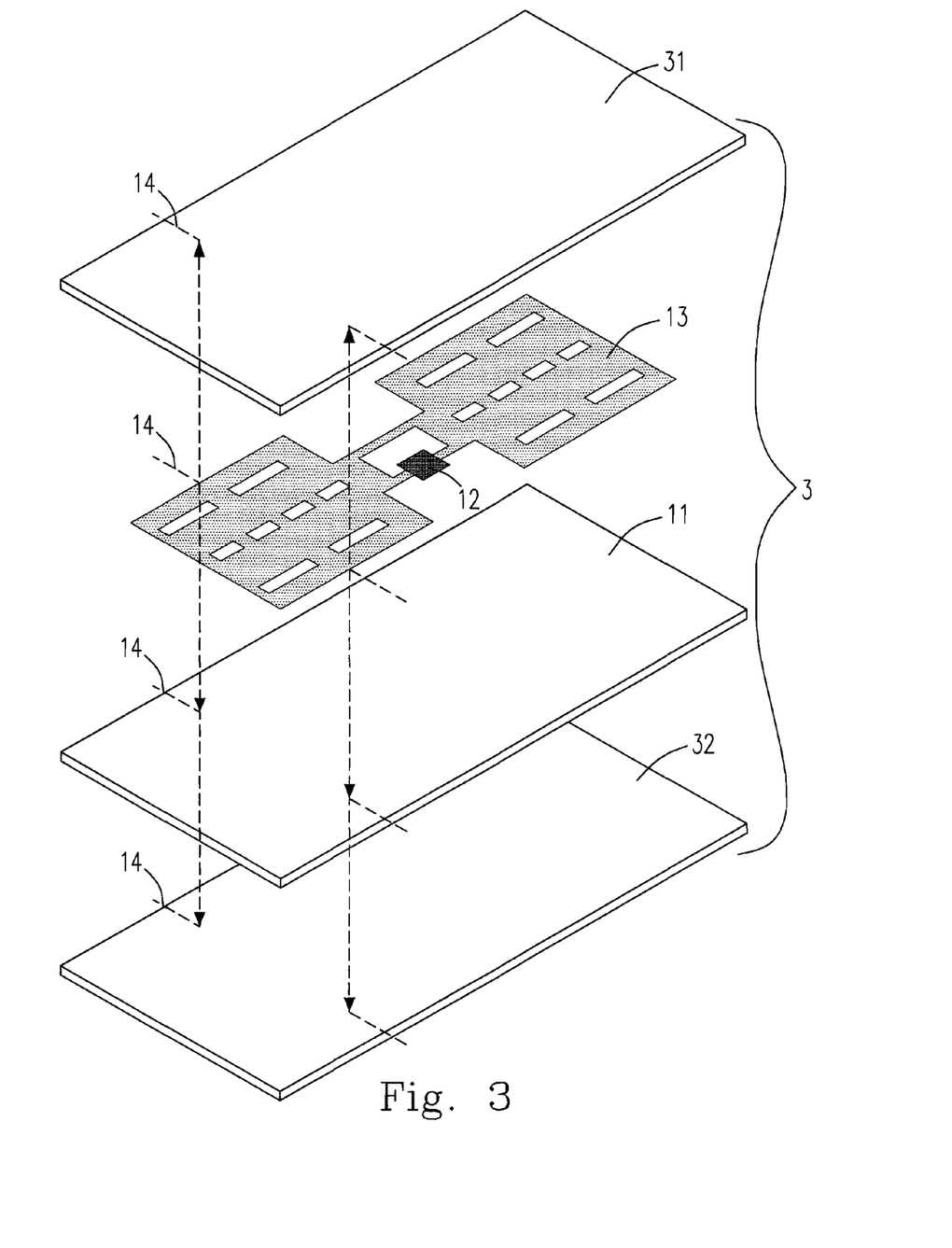
FIG. 3 is an exploded view of the radio frequency identification tag according to a fifth preferred embodiment of the present invention.

Please refer to FIG. 3, which is an exploded view of the radio frequency identification tag according to a fifth preferred embodiment of the present invention. The difference between this embodiment and the fourth embodiments is that the RFID tag 3 of this embodiment includes two pieces of cover plates, the top covering plate 31 and the bottom covering plate 32. Therefore, the substrate 11, the antenna 13 and the integrated circuit 12 can be packaged between the top covering plate 31 and the bottom covering plate 32. The materials and the packaging methods of the covering plates are the same as those of the fourth embodiment, and are not mentioned again here.

The application methods of the RFID tags 1, 2 and 3 are described as follows. The RFID reading and writing machine can transmit radio energy with the specific frequency to the RFID tags 1, 2 and 3, in order to activate the integrated circuit 12 to transmit the stored identification information out, and then the RFID reading and writing machine can receive and decode this information and send it to the database of the system for the follow-up applications. Currently the available frequency band of the RFID is in the ultra high frequency band. The transmission distance of the RFID tags 1, 2 and 3 can reach up to 5 meters by using this ultra high frequency band. Since the RFID tags are readable and available for the long distance communication, the RFID reading and writing machine can monitor the moving history of the merchandise. If a thief has the RFID reading and writing machine, then he can know what kind of merchandise is in the bags carried by all the customers walking out the store.

Figure 4:
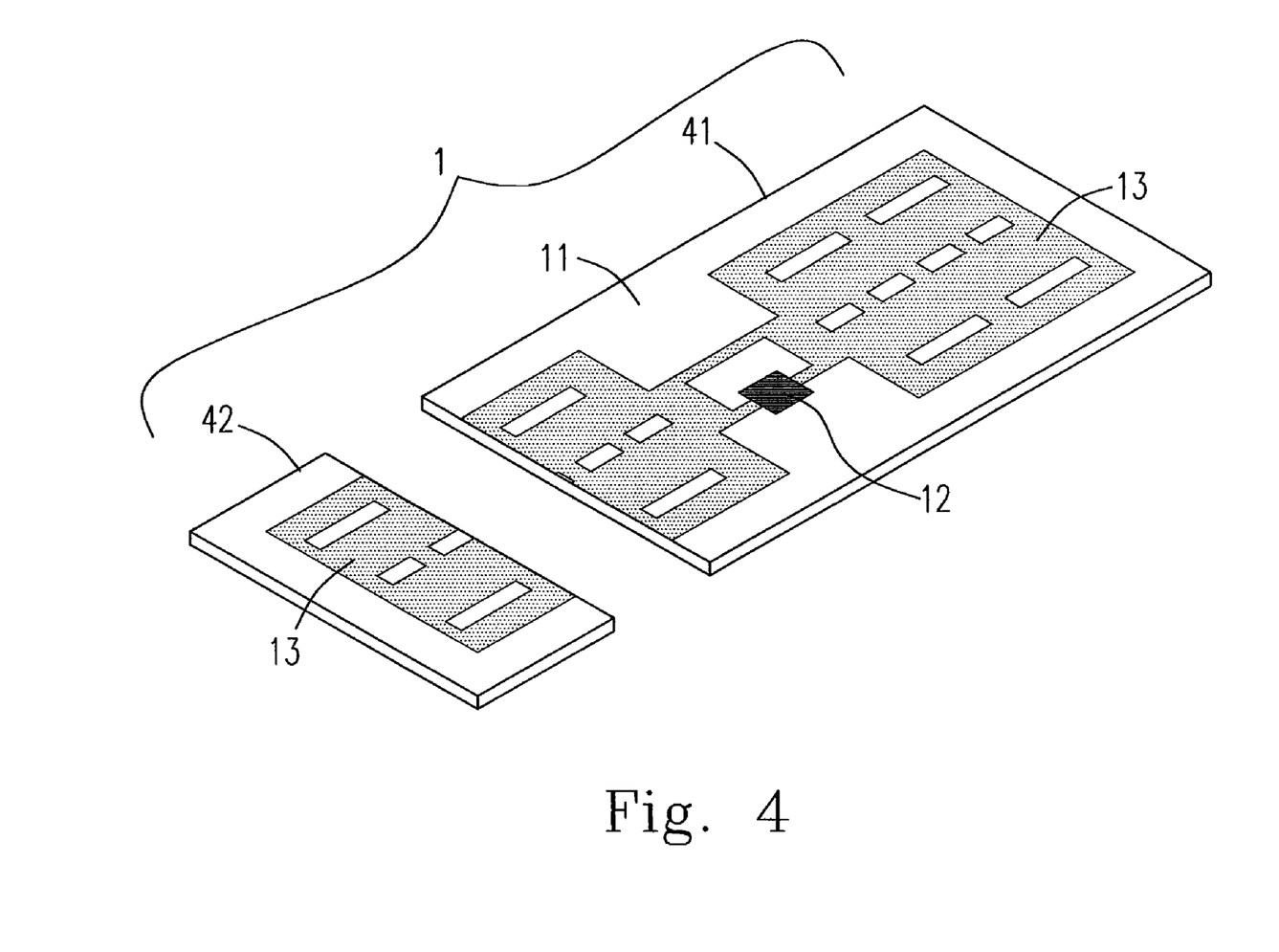
FIG. 4 is a schematic diagram showing the radio frequency identification tag of FIG. 1 after breaking along the cutting indication.

Please refer to FIG. 4, which is a schematic diagram showing the radio frequency identification tag 1 of FIG. 1 after breaking along the cutting line 14. In order to solve the privacy invasion problem involved with the RFID system, the present invention provides a cutting line 14 on the RFID tag 1. When the merchandise is sold, the seller can break the RFID tag 1 along the cutting line 14 into two parts. The first part 31 contains the integrated circuit 12 and a part of the antenna 13, while the second part 32 contains only the other part of the antenna 13. The first part 31 of the RFID tag 1 is attached to the merchandise, which is carried out of the store by the customer. Since a part of the antenna 13 on the RFID tag 1 is damaged after breaking, the communication distance of the RFID 1 is largely shortened, and therefore the customer does not need to worry about the privacy invasion problem anymore. Furthermore, if the customer wants to return or to replace the merchandise, the first part 31 of the RFID tag 1 still maintains the identification function, though the antenna 13 of the first part 31 of the RFID tag 1 has been partially damaged. The seller still can use the RFID reading and writing machine within the specific distance from the merchandise to catch the information for the follow-up control and management. This specific distance can be varied according to the various pattern designs of the antenna before and after breaking. In one embodiment, this specific distance can be as short as 5 centimeters. Therefore, the location of the cutting line 14 can be designed anywhere as long as the integrated circuit 12 is not damaged and some part of antenna 13 is still connected to the integrated circuit 12 after breaking. Then the goals of both shortening the communication distance of the RFID tags and reusing the RFID tags can be achieved. More than one cutting line can be disposed as well to further reduce the size of the antenna 13. Therefore, by using the present invention, the customers can keep the privacy, and the sellers can have the convenience for the warehouse and logistics control and management.

The RFID tags 1, 2 and 3 of the present invention are not limited to the use of labeling the merchandise in the retail business. The RFID systems have been applied to a lot of fields widely. It is within the protecting scope of the present invention to use the design of the cutting line or cutting notch to damage the antenna without affecting the identification function in the shorter radio communication distance.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A radio frequency identification tag comprising:
a body comprising:
a substrate;
an antenna disposed on the substrate, including a first part and a second part; and
an integrated circuit disposed on the substrate and electrically connected to the antenna; and
a cutting indication formed on the body, wherein an extension of the cutting indication intersects with the antenna to separate the body into two parts after breaking, one of the two parts comprises the integrated circuit and the first part of the antenna, and the other of the two parts comprises only the second part of the antenna.

2. The radio frequency identification tag as in claim 1, wherein the body further comprises two covering pieces for packaging the substrate, the antenna and the integrated circuit therebetween, and the integrated circuit comprises a memory for storing an information.

3. The radio frequency identification tag as in claim 2, wherein the two covering pieces are made of a flexible material.

4. The radio frequency identification tag as in claim 3, wherein the flexible material is selected from a group consisting of a fiber, a synthetic paper, a plastic, and a polymer material.

5. The radio frequency identification tag as in claim 1, wherein the body further comprises a piece for packaging the antenna and the integrated circuit between the substrate and the piece.

6. The radio frequency identification tag as in claim 5, wherein the piece is made of a flexible material.

7. The radio frequency identification tag as in claim 6, wherein the flexible material is selected from a group consisting of a fiber, a synthetic paper, a plastic, and a polymer material.

8. The radio frequency identification tag as in claim 1, wherein the substrate is made of a flexible material, and the antenna is a loop circuit.

9. The radio frequency identification tag as in claim 8, wherein the flexible material is selected from a group consisting of a fiber, a synthetic paper, a plastic, and a polymer material.

10. The radio frequency identification tag as in claim 1, wherein the antenna comprises two circuits mounted respectively on two opposite sides of the integrated circuit.

11. The radio frequency identification tag as in claim 1, wherein the cutting indication is one of a cutting line and a cutting notch.

12. The radio frequency identification tag as in claim 1, wherein the material of the antenna is selected from a group consisting of conductive ink, conductive polymer, gold, copper, iron, silver, aluminum, chrome, and alloy thereof.

13. The radio frequency identification tag as in claim 1, wherein the one of the two parts comprises the integrated circuit, and the first part of the antenna is capable of performing the radio frequency communication.

14. A method for fabricating a radio frequency identification tag, comprising the steps of:
  providing a substrate;
  forming a body by disposing an integrated circuit and an antenna including a first part and a second part on a surface of the substrate;
  electrically connecting the integrated circuit and the antenna; and
  forming a cutting indication on the body, wherein an extension of the cutting indication intersects with the antenna to separate the body into two parts after breaking, wherein one of the two parts comprises the integrated circuit and the first part of the antenna, and the other of the two parts comprises only a second part of the antenna.

15. The method for fabricating a radio frequency identification tag as in claim 14, further comprising a step of providing a piece for packaging the antenna and the integrated circuit between the substrate and the piece, before forming the cutting indication.

16. The method for fabricating a radio frequency identification tag as in claim 14, further comprising a step of providing two pieces for packaging the antenna and the integrated circuit therebetween, before forming the cutting indication.

17. The method for fabricating a radio frequency identification tag as in claim 14, wherein the cutting indication is one of a cutting line and a cutting notch.

18. A use of a radio frequency identification tag, wherein the radio frequency identification tag comprises a body, and a cutting indication formed on the body, wherein the body comprises a substrate, an antenna mounted on the substrate, and an integrated circuit mounted on the substrate and electrically connected to the antenna for performing a radio frequency communication, and an extension of the cutting indication intersects with the antenna to separate the body into two parts after breaking, comprising steps of:
  disposing the radio frequency identification tag on an article; and
  separating the radio frequency identification tag into two parts and leaving the part comprising the integrated circuit and a part of the antenna on the article.

19. The use of a radio frequency identification tag in claim 18, further comprising a step of:
  updating an information of the article by performing another radio frequency communication with the part of the radio frequency identification tag kept by the buyer, wherein the separating step is performed by tearing along the cutting indication and the cutting indication is one of a cutting line and a cutting notch.

* * * * *